(12) United States Patent
Bosaglia et al.

(10) Patent No.: US 12,216,131 B2
(45) Date of Patent: Feb. 4, 2025

(54) APPARATUS HAVING ONE OR MORE SENSORS FOR SAMPLING THE HEADSPACE AND PROCESS FOR SAMPLING THE HEADSPACE

(71) Applicant: THERMO FISHER SCIENTIFIC SPA, Rodano MI (IT)

(72) Inventors: Tiziano Bosaglia, Rodano MI (IT); Riccardo Facchetti, Rodano MI (IT); Eugenio Pettenon, Rodano MI (IT); Flavio Antoniucci, Rodano MI (IT)

(73) Assignee: THERMO FISHER SCIENTIFIC SPA, Rodano MI (IT)

( * ) Notice: Subject to any disclaimer, the term of this patent is extended or adjusted under 35 U.S.C. 154(b) by 852 days.

(21) Appl. No.: 16/433,368

(22) Filed: Jun. 6, 2019

(65) Prior Publication Data
US 2019/0376990 A1    Dec. 12, 2019

(30) Foreign Application Priority Data
Jun. 8, 2018 (IT) .................. 102018000006169

(51) Int. Cl.
*G01N 35/00* (2006.01)
*G01N 35/02* (2006.01)

(52) U.S. Cl.
CPC ....... *G01N 35/00584* (2013.01); *G01N 35/02* (2013.01); *G01N 2035/00346* (2013.01)

(58) Field of Classification Search
None
See application file for complete search history.

(56) References Cited

U.S. PATENT DOCUMENTS 3,809,897 A * 5/1974 Thomas .................. G01T 7/08
                                                   250/328
4,220,855 A * 9/1980 Johnson .................. G01T 1/204
                                                   250/328
(Continued)

FOREIGN PATENT DOCUMENTS

JP            6068251 B2 *  1/2017  ............... G01N 1/22

OTHER PUBLICATIONS

Italian priority search report issued on Feb. 28, 2019 by the EPO for Italian priority application No. 102018000006169.
(Continued)

*Primary Examiner* — P. Kathryn Wright
*Assistant Examiner* — Curtis A Thompson

(57) ABSTRACT

The present invention relates to an apparatus (1) for sampling the headspace, comprising: a mobile station (2) provided with a plurality of housing seats (21) to house a plurality of containers (100) for sampling the headspace; an oven (3); a blocking device (4) comprising at least one first mobile element (41) that moves between a first position adapted to prevent a container (100) from passing from the mobile station (2) to the oven (3), and a second position adapted to allow a container (100) to pass from the mobile station (2) to the oven (3); at least one first sensor (5a) placed upstream of the first mobile element (41), to detect the presence of a container (100) in a housing seat (21); a movement element (6) moving between said mobile station (2) and the oven (3), the movement element being configured to move a container (100) from the mobile station (2) to the oven (3).

21 Claims, 12 Drawing Sheets

(56) References Cited

U.S. PATENT DOCUMENTS

| | | | | |
|---|---|---|---|---|
| 4,595,562 A * | 6/1986 | Liston | ................... | G01N 35/04 |
| | | | | 422/561 |
| 4,773,788 A * | 9/1988 | Ruhl | .................... | B29C 31/006 |
| | | | | 403/348 |
| 5,595,707 A | 1/1997 | Copeland et al. | | |
| 5,948,360 A | 9/1999 | Rao et al. | | |
| 6,146,895 A * | 11/2000 | Green | ................... | G01N 30/24 |
| | | | | 366/108 |
| 2001/0010462 A1* | 8/2001 | Kawanishi | ......... | H05K 13/0084 |
| | | | | 324/750.15 |
| 2001/0019826 A1* | 9/2001 | Ammann | ................ | B01F 29/30 |
| | | | | 435/6.11 |
| 2004/0208787 A1* | 10/2004 | Takahashi | .............. | G01N 35/02 |
| | | | | 422/64 |
| 2004/0265173 A1* | 12/2004 | Matsumoto | .......... | G01N 35/025 |
| | | | | 422/64 |
| 2008/0241937 A1* | 10/2008 | Wakamiya | ....... | G01N 35/00693 |
| | | | | 422/68.1 |
| 2008/0264092 A1* | 10/2008 | Chase | ................... | F25D 23/126 |
| | | | | 221/13 |
| 2011/0157604 A1* | 6/2011 | Wyble | .................... | G03G 15/65 |
| | | | | 356/621 |
| 2011/0239792 A1* | 10/2011 | Sato | ....................... | G01N 30/16 |
| | | | | 73/863.11 |
| 2012/0015449 A1 | 1/2012 | Fiedler | | |
| 2014/0026757 A1* | 1/2014 | Inoue | ................. | G01N 35/1081 |
| | | | | 96/101 |
| 2014/0246008 A1* | 9/2014 | Martin | .................. | F24C 15/027 |
| | | | | 108/21 |
| 2016/0332765 A1* | 11/2016 | Thompson | ................ | B65C 3/16 |
| 2017/0319718 A1* | 11/2017 | Robinson | ............. | A61K 49/227 |
| 2019/0049478 A1* | 2/2019 | Forrer | ................ | G01N 35/1083 |
| 2019/0321771 A1* | 10/2019 | Bosaglia | ................ | G01N 35/04 |

OTHER PUBLICATIONS

European Search Report issued by the EPO on Jul. 12, 2019 for corresponding EP application No. 19178014.7.

* cited by examiner

APPARATUS HAVING ONE OR MORE SENSORS FOR SAMPLING THE HEADSPACE AND PROCESS FOR SAMPLING THE HEADSPACE

This Application is a U.S. Non-Provisional Application which claims priority to and the benefit of Italian Patent Application no. 102018000006169 filed Jun. 8, 2018, the content of which is incorporated herein by reference in its entirety.

The present invention refers to materials analysis. Specifically, this invention concerns an apparatus and a process for sampling the headspace, a technique that is typically used for the analysis of liquid or solid samples via the coupling with a gas chromatograph or similar analytical instrument.

Gas chromatography, as known, is an advantageous method for determining the components of a mixture. In order to carry out a gas chromatographic analysis, a sample of the mixture to be analyzed must be volatilized and introduced into a gas chromatographic column where its different components separate and reach the outlet at different times. The various separate components can be detected through one or more of their chemical or physical properties.

The headspace sampling technique is a technique that involves the analysis of a vapor, generated by a solid or liquid sample in a closed container. In other words, a closed container or vial is partially filled with a liquid or solid sample; above the sample, i.e. in the so-called "headspace", vapors develop and are then collected to be analyzed. As a result of the temperature and, in the case of liquid samples, the shaking, the substances to be analyzed are "moved" to the gaseous phase, and then collected by special means, such as a needle inserted into the vial through a septum.

Preferably, in order to increase the sensitivity of the gas chromatographic analysis, the substances to be analyzed should be highly concentrated in the headspace, i.e. the transition from the liquid phase to the head space must be maximized; it is also particularly advantageous to minimize the time required to carry out this operation.

In the known technique applied to liquid samples, vials are heated and shaken so as to promote and accelerate the accumulation of the substance to be analyzed in the headspace until thermodynamic equilibrium is reached, i.e. at the point where the substances were distributed between the two phases (liquid and gaseous) and maintain stable concentrations over time.

Therefore, the apparatuses for sampling the headspace are generally equipped with a mobile station to house the vials, and with an incubation oven to heat and, if necessary, shake the vials.

The movement of the vial from the mobile station to the incubation oven is typically performed in an unattended manner. In particular, a special device moves the desired vial from the mobile station to the incubation oven. At the end of the sampling process, the vial is then unloaded from the incubation oven and repositioned on the mobile station, usually in its original position.

A potential system error may cause an unwanted vial to be moved in the incubation oven and/or an unwanted vial to be present in the mobile station. These situations can potentially cause errors in the subsequent steps of gas chromatographic analysis. In addition, the system may attempt to place a vial in a position already occupied by a previous vial. In this case, the previous vial may be incorrectly released from the mobile station and may break due to a fall, thereby potentially releasing toxic substances.

Therefore, it is an object of the present invention to solve the above-described problems of the known art.

A particular object of the present invention is to provide an apparatus and a process for sampling the headspace which allow the vials or containers to be easily and safely managed.

These and other objects are solved by the present invention by means of an apparatus and a process according to one or more of the appended claims.

An aspect of the present invention relates to an apparatus for sampling the headspace, comprising: a mobile station provided with a plurality of housing seats to house a plurality of containers for sampling the headspace; a heater; a blocking device comprising at least one first mobile element that moves between at least two positions, a first position configured to prevent a container from passing from the mobile station to the heater, and a second position configured to allow a container to pass from the mobile station to the heater; at least one first sensor placed upstream of the first mobile element, to detect the presence of a container in one of the housing seats; a movement element that is movable between the mobile station and the heater, the movement element being configured to move a container from the mobile station to the heater.

Thanks to the present solution, the headspace sampling apparatus is able to determine which mobile station seats are provided with a container and which are free, in order to prevent positioning errors of the containers themselves.

According to an aspect of the present invention, the apparatus comprises a second sensor placed downstream of the first mobile element of the blocking device to detect the presence of a container in the heater.

It should be noted that, here and below, the definitions 'upstream' and 'downstream' will be used. These definitions refer to the direction of movement of a container when it is moved from the mobile station to the heater.

This also makes it possible to detect if there are free spaces for a container in the heater, so as to prevent containers from being arranged in the heater when the latter is already occupied.

According to an aspect of the present invention, the first mobile element is rotatable, preferably in the form of a disc and provided with an opening adapted to define the aforementioned first and second positions.

According to an aspect of the present invention, the first mobile element is movable to a third position adapted to prevent a container from passing from the mobile station to the heater and to allow the contact between a container and the movement element.

According to an aspect of the present invention, the blocking device comprises a second mobile element placed downstream of the first mobile element, the second mobile element being movable between a first position adapted to prevent a container from passing from the mobile station to the heater, and a second position adapted to allow a container to pass from the mobile station to the heater.

Preferably, the second mobile element is rotatable, too, and is typically disc-shaped.

According to an aspect of the present invention, the sensor placed downstream of the first mobile element is placed upstream of the second mobile element.

An aspect of the present invention further relates to a process for transferring a container from the mobile station to the heater of an apparatus according to one of the preceding claims, comprising the steps of: i) moving the mobile station so that a housing seat is arranged in the desired position; ii) operating the first sensor to verify the presence of a container in the housing seat; iii) operating the movement element to reach the container; iv) moving the first mobile element to the second position; v) operating the movement element so that the container is moved from the station to the heater; wherein steps iv) and v) are carried out only if in step ii) the presence of the container in the housing seat has been confirmed.

Not all of the operations listed above must be carried out in the order described above; in particular, steps iii) and iv) may occur at least partially at the same time, or in reverse order with respect to what described.

According to an aspect of the present invention, preferably, when in the apparatus there is the second sensor too, in step v), the height and/or volume of the container are estimated, as a function of the signal of the aforementioned first sensor and/or (if present) second sensor.

The determination of the height and/or volume of the container is useful for the subsequent operations of the apparatus. In particular, if the volume, or at least the height, of the container is estimated correctly, it is possible to determine the correct depth to which an element suitable for collecting a sample (typically in the form of a needle) has to be inserted into the container, and it is also possible to determine the correct amount of gas to be inserted into the container itself.

An aspect of the present invention also relates to a process for transferring a container from the heater to the mobile station, comprising the steps of: i') moving the mobile station so that a housing seat is arranged in the desired position; ii') operating the first sensor to verify the absence of a container in the housing seat; iii') moving the first mobile element to the first position; iv') operating the movement device so that the container is moved from the heater to said mobile station; v') moving the first mobile element to the second position.

Now, referring to the appended figures, exemplary and non-limiting embodiments of the present invention will be described, wherein.

Figure 1:
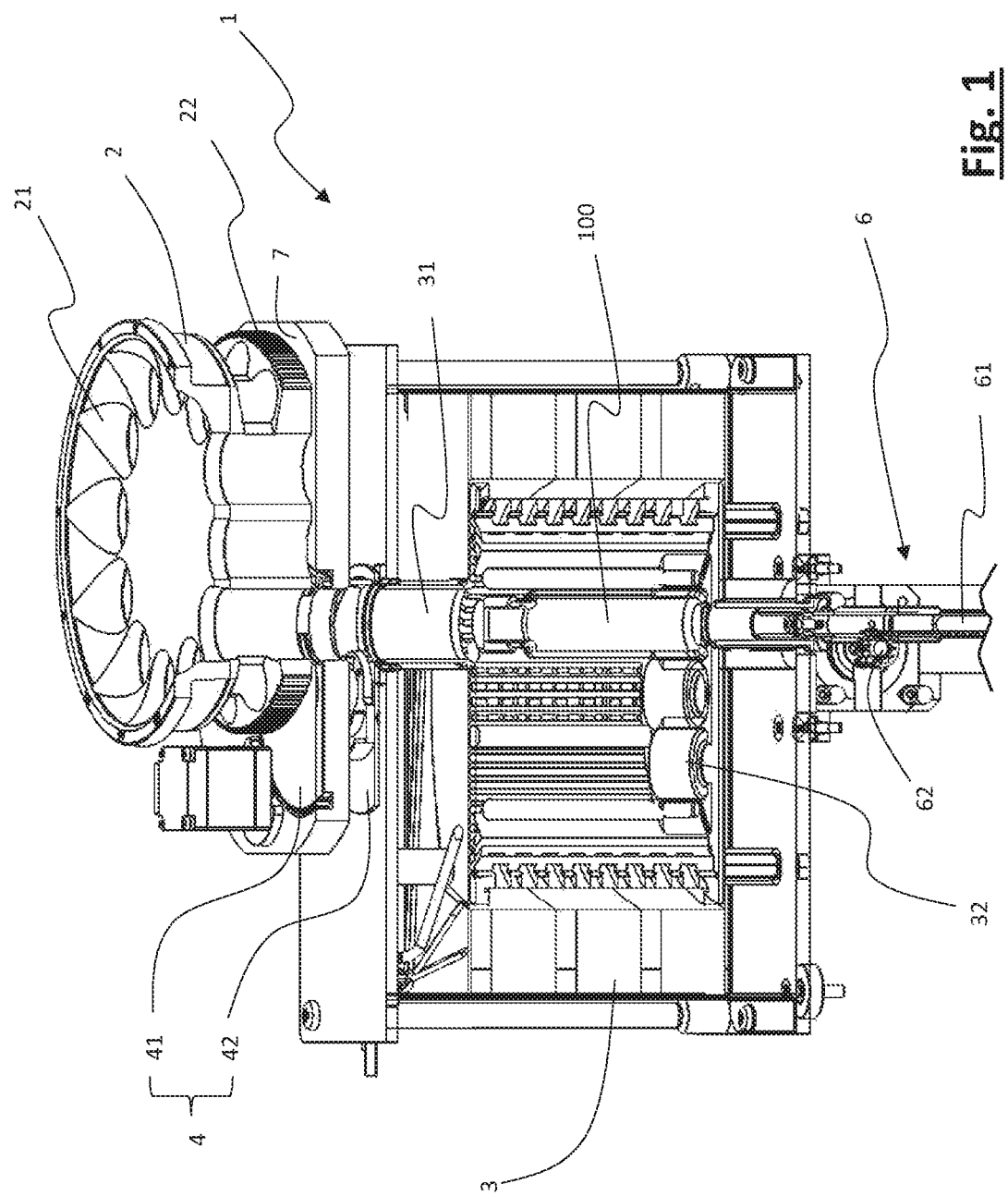
FIG. 1 is a perspective view of an apparatus according to an embodiment of the present invention.
Figure 2:
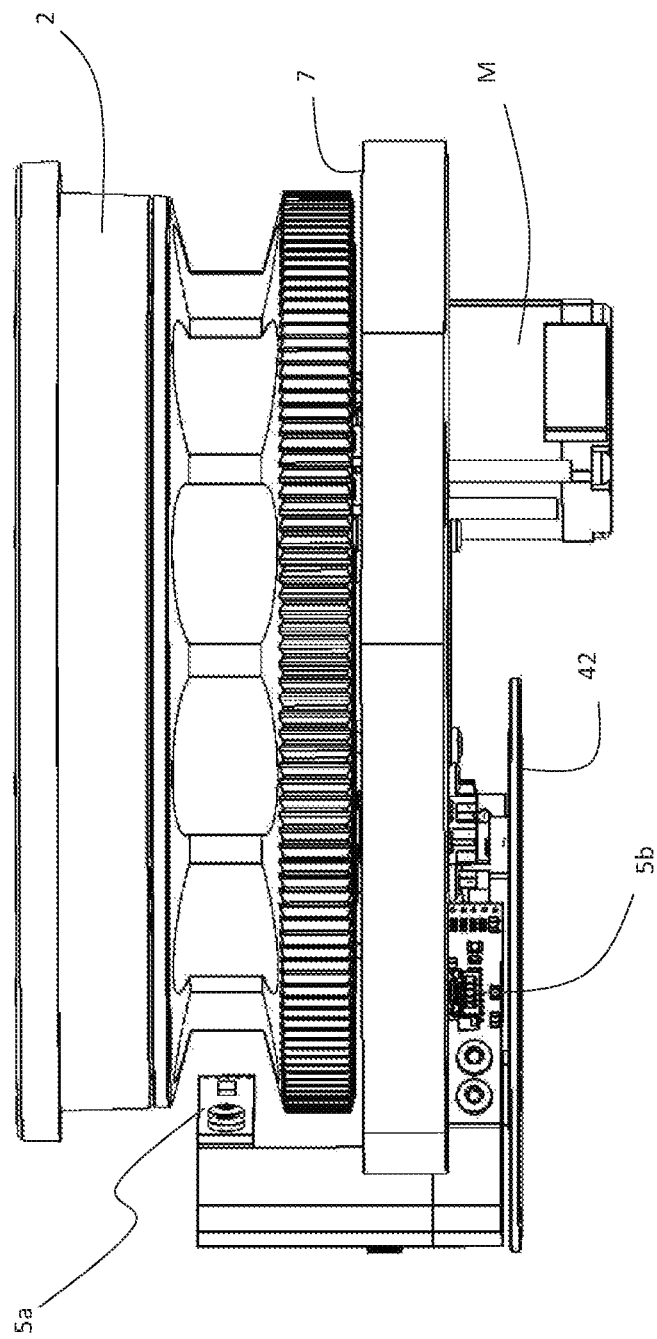
FIG. 2 is a front view of the upper portion of the apparatus of FIG. 1.
Figure 3:
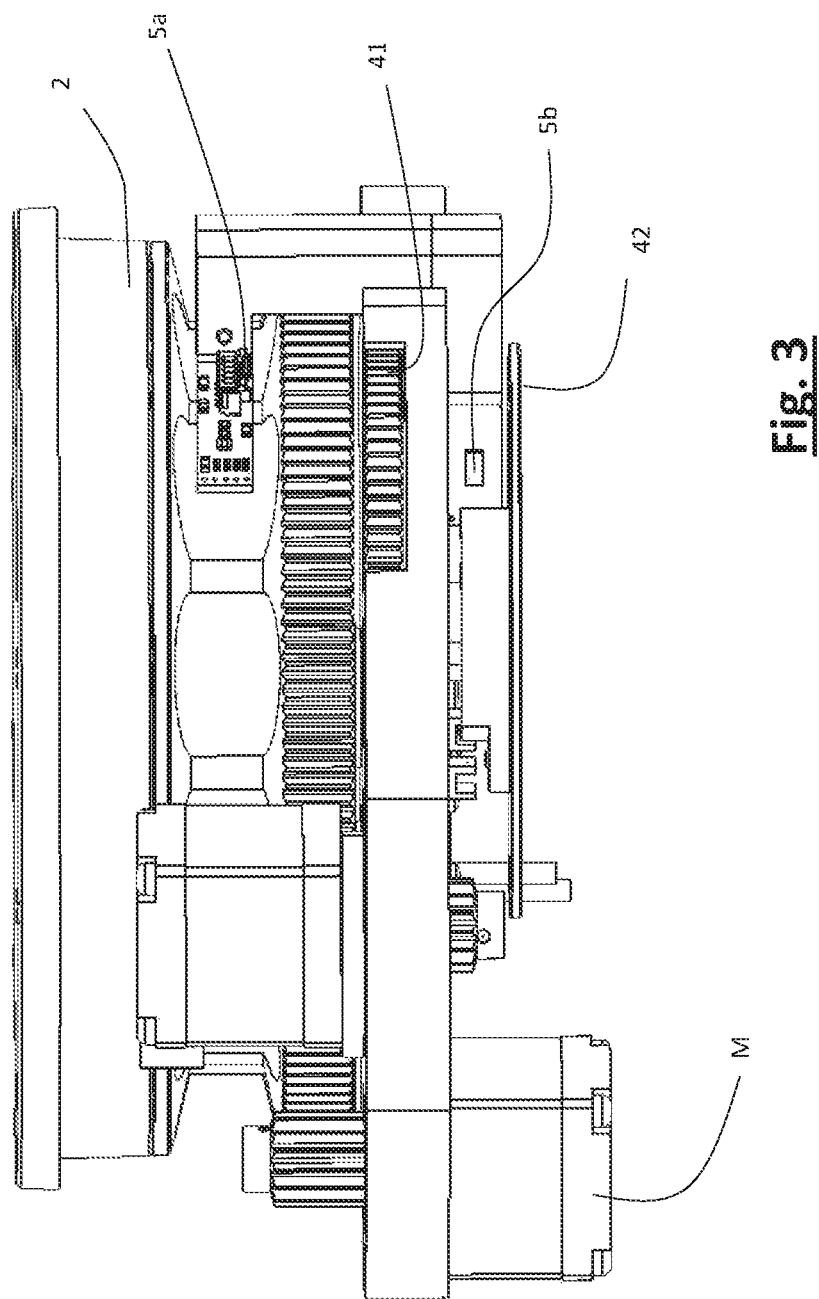
FIG. 3 is a rear view of what shown in FIG. 2.

A headspace sampling apparatus 1 comprises a mobile station 2, a heater 3, a blocking device 4 typically placed between the mobile station 2 and the heater 3, at least one first sensor 5a and a movement element 6 configured to move a container 100 between the mobile station 2 and the heater 3 (also referred to below as "oven 3" for the sake of simplicity).

As shown in figures, the mobile station 2 is preferably in the form of a carousel, although other embodiments are possible, for example a mobile station could comprise a belt or rail or anyway an element whose movement is, at least partially, substantially straight.

In general, the mobile station 2 (henceforth also referred to as "station 2" for the sake of simplicity) is provided with a plurality of housing seats 21 shaped so as to house a container 100 (typically in the form of a vial or similar element) for the analysis of the headspace. For example, in the embodiment shown in the figures, the station 2 is provided with twelve housing seats 21 (henceforth also "seats 21").

The seats 21 can have various shapes. Preferably, as in the embodiment shown, the seats 21 are made as cylindrical openings. Typically, the respective containers 100 are not supported by the seats 21 from below and, as a result, protrude below from the seats 21. A relevant surface 7, typically placed below the station 2, acts as lower support for the containers 100, at least along part of the path of the containers 100 moved by the mobile station 2.

The station 2 is configured to move the seats 21 so as to arrange the respective containers 100 in the desired position. Typically, the movement means 6 are able to cooperate with a container 100 only when the latter is placed in a particular position of the apparatus 1, from now on referred to as "operating position", while the other positions of the seats 21 will be referred to as "rest positions" for simplicity. This denomination is only descriptive, and does not exclude that other operations (other than those suitable for moving the container 100 between the station 2 and the oven 3) may be carried out on the containers 100 when the respective seats 21 are arranged in the "rest position".

Preferably, the station 2 is placed above the oven 3. Therefore, the oven 3 typically has a duct 31 configured to allow a container 100 to be displaced between the station 2 and the oven 3. Therefore, a seat 21 arranged coaxially with the duct 31 is in "operating position", while the other seats 21 are in "rest positions". In alternative embodiments, not shown, the operating positions could be more than one. For example, referring to the embodiment shown, the oven could be provided with two ducts, for example a first duct adapted to allow a container 100 to be moved from the station 2 to the oven 3, and a second duct adapted to allow a container 100 to be moved from the oven 3 to the station 2.

The apparatus 1 typically has an engine M configured to move the station 2. In the embodiment shown, a portion 22 of the outer surface of the station 2 is toothed, and meshes with the motor M.

Figure 4:
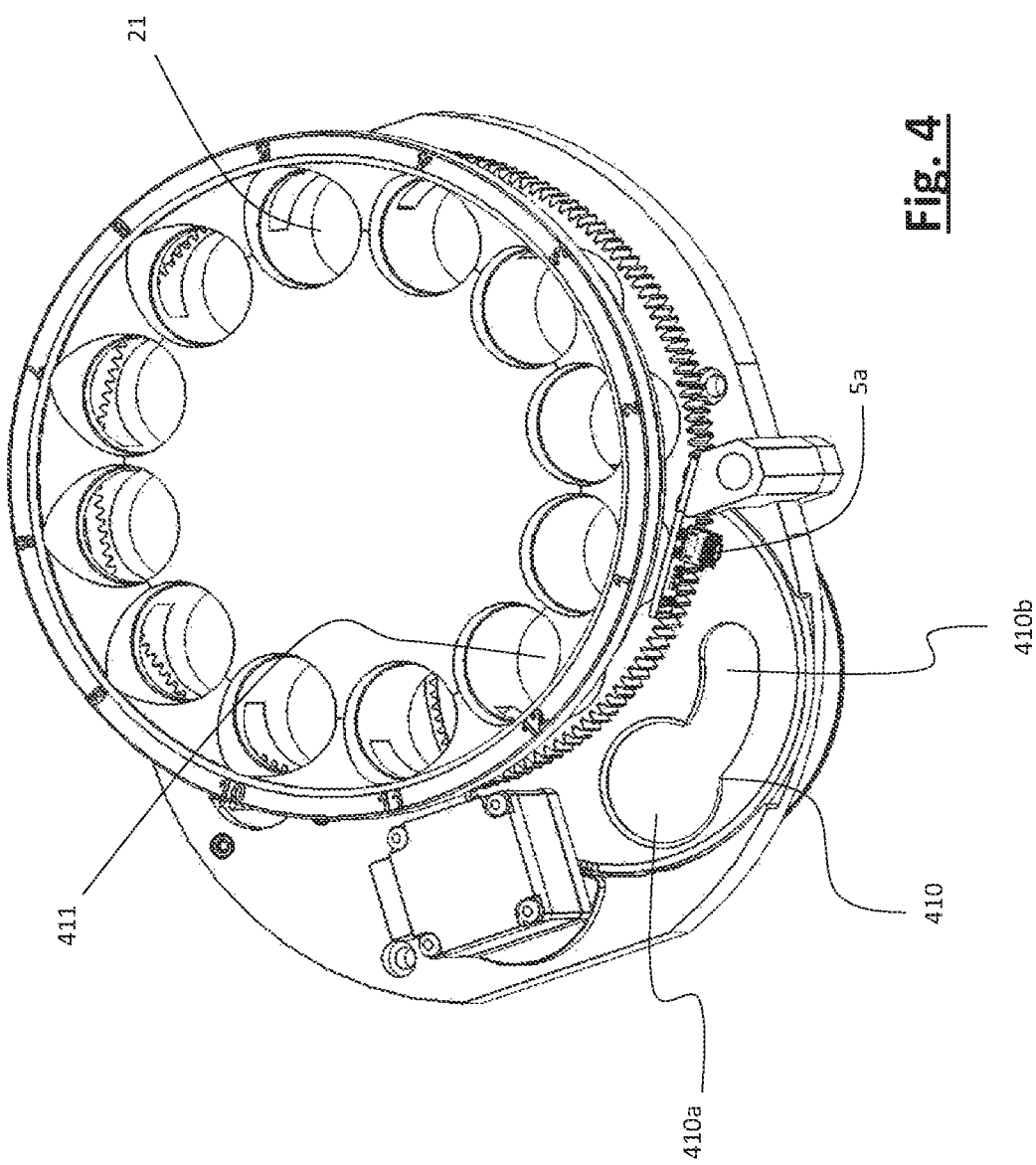
FIG. 4 is a top perspective view of FIG. 2.
Figure 5:
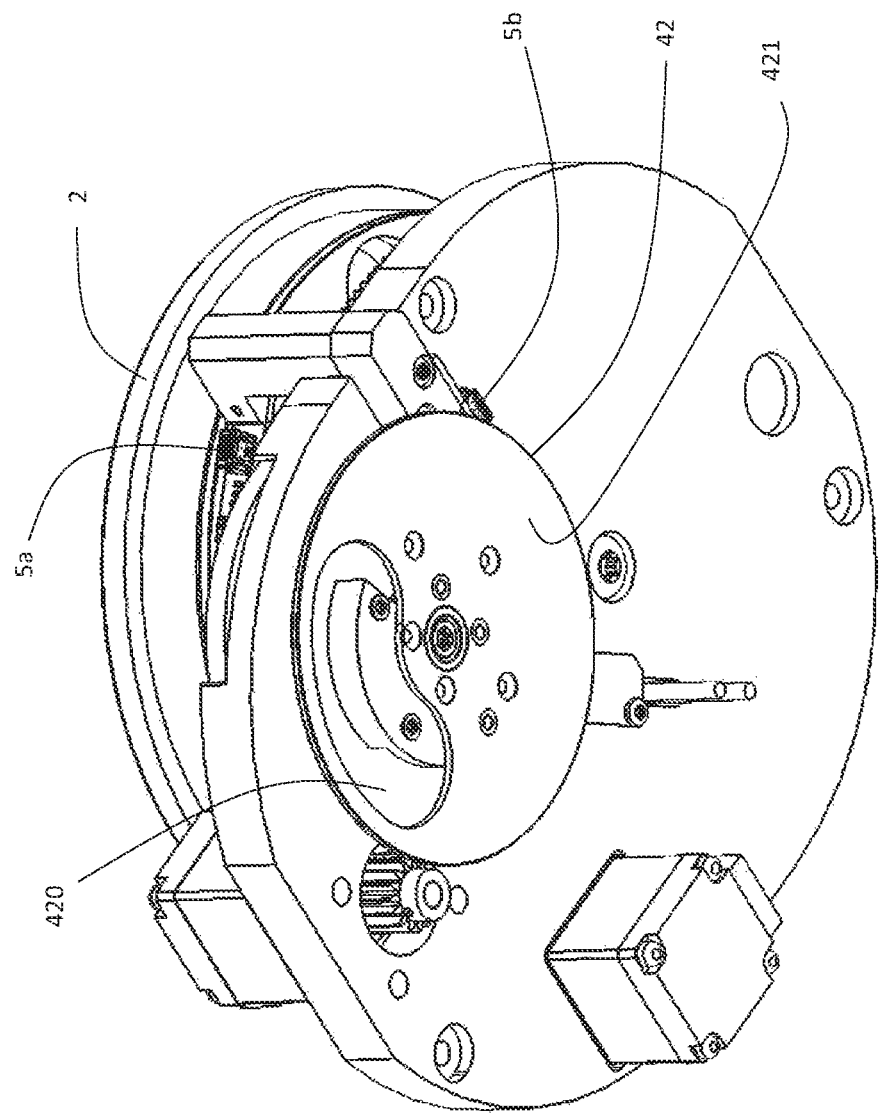
FIG. 5 is a bottom perspective view of what shown in FIG. 2.
Figure 6B:
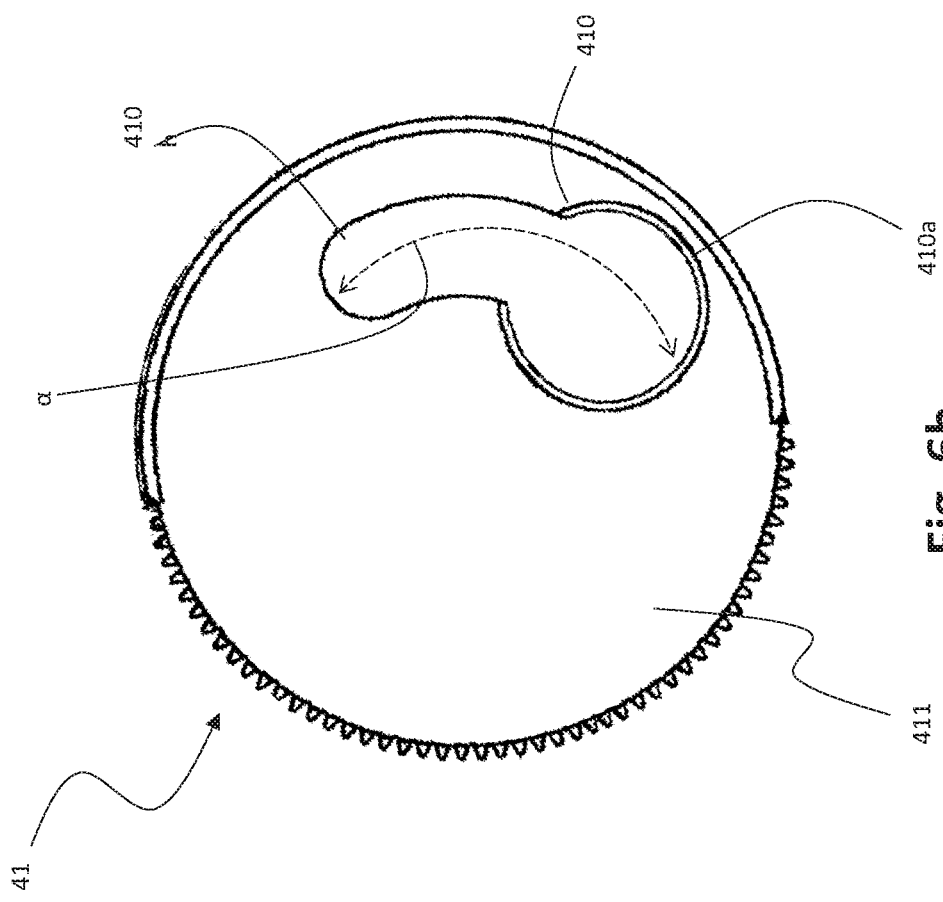
FIGS. 6a and 6b are plan views of the mobile elements of the blocking device of the apparatus of FIG. 1.
Figure 6A:
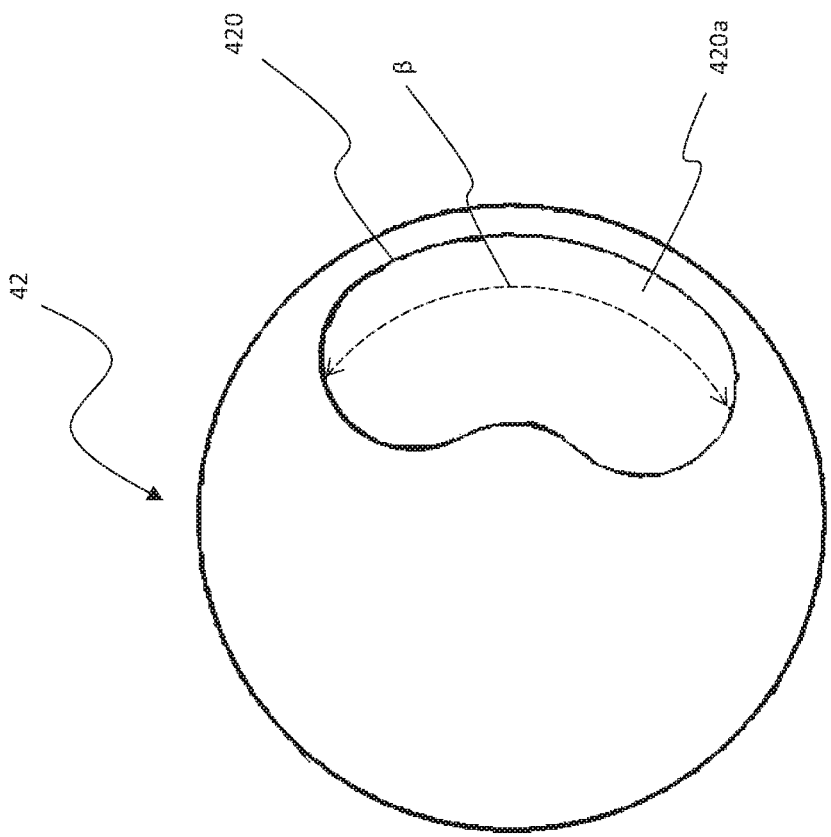
Figure 7:
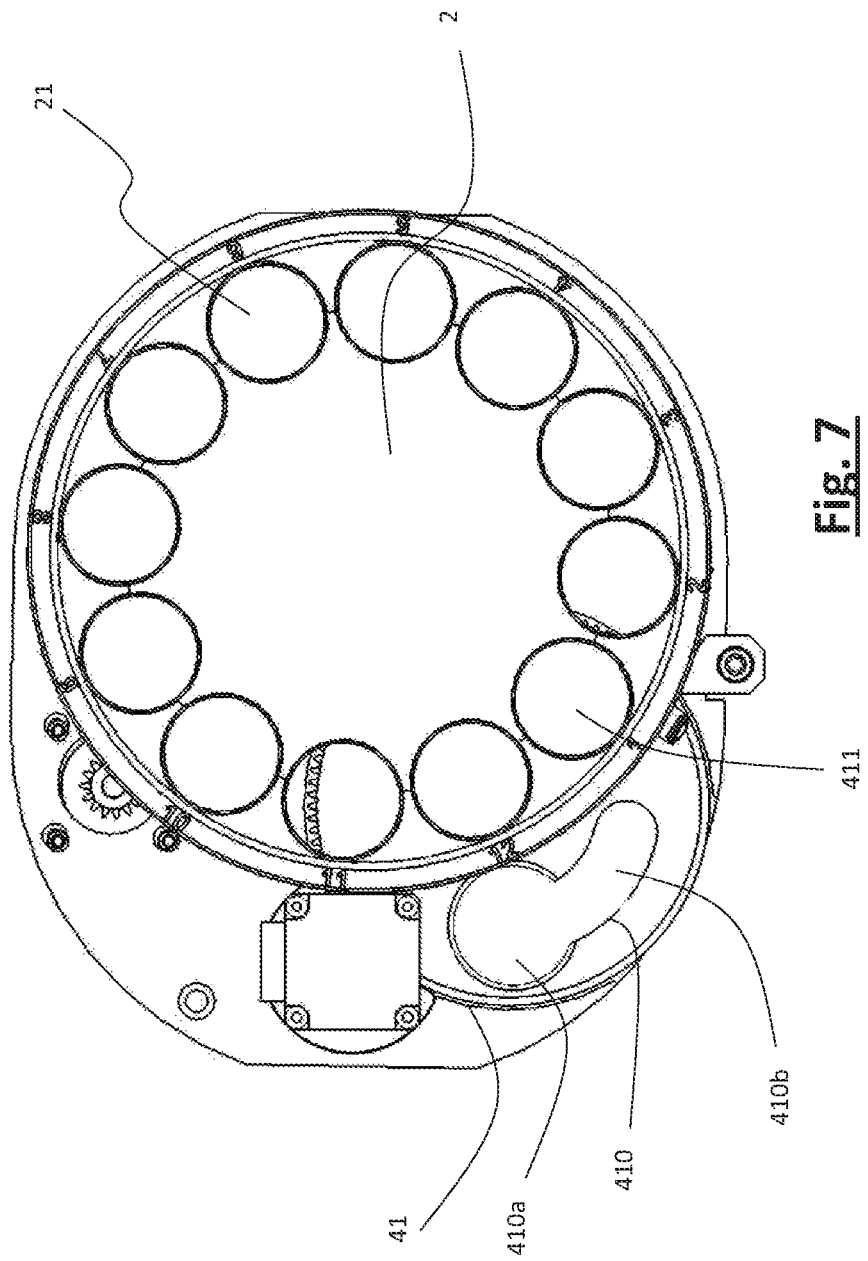
FIGS. 7-9 are plan views of what shown in FIG. 2, wherein the first mobile element of the blocking device is shown in different positions.
Figure 9:
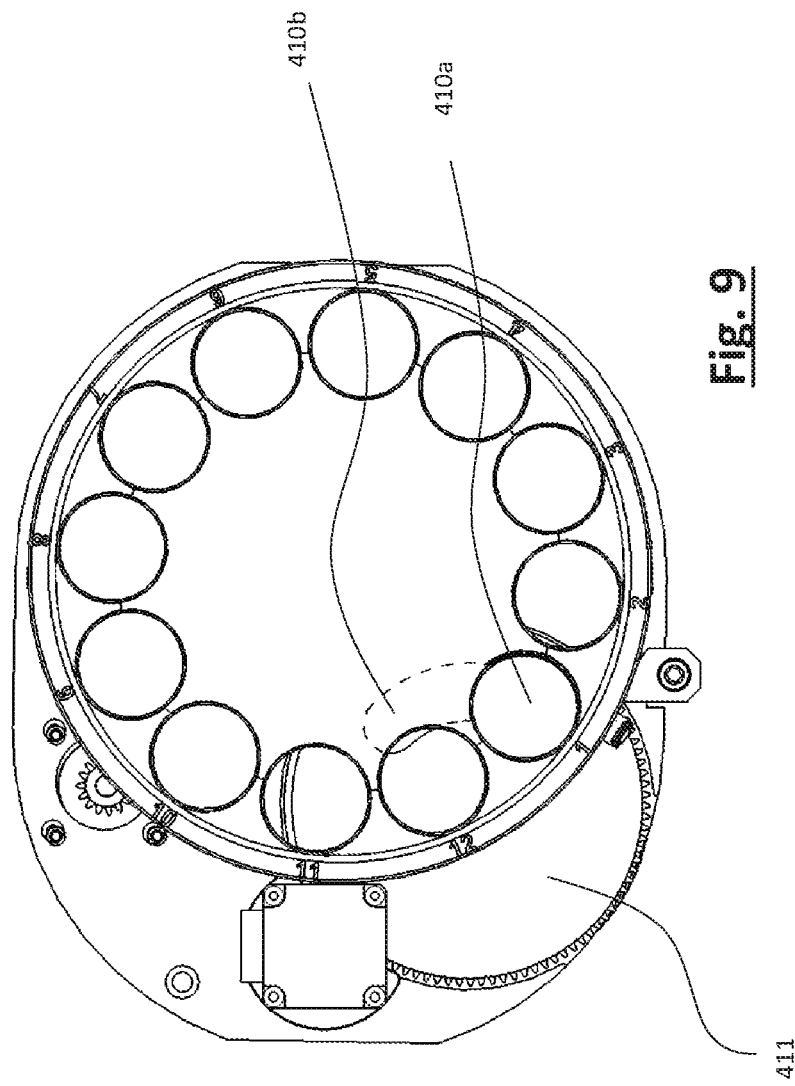
Figure 10:
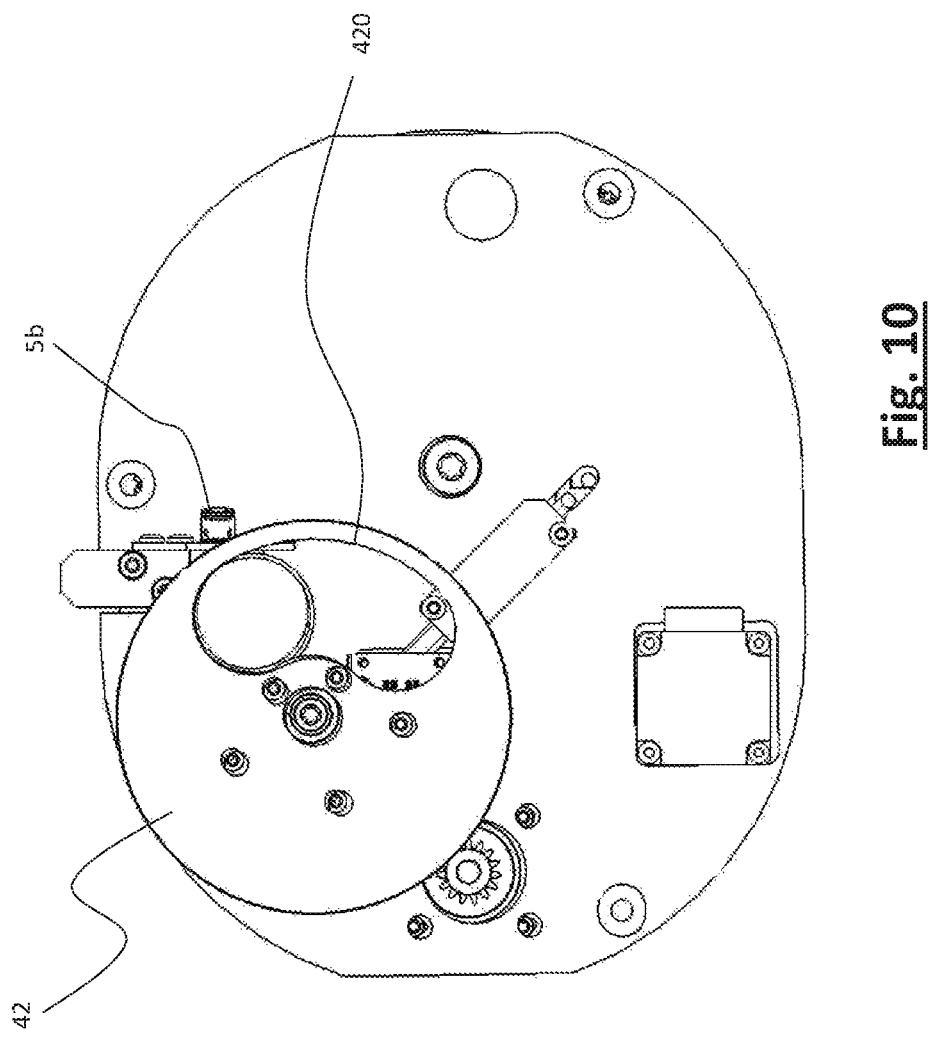
FIG. 10 is a bottom view of what shown in FIG. 2.

A blocking device 4 is interposed between the station 2 and the oven 3, in order to selectively allow and prevent the passage of a container 100 between the station 2 and the oven 3. The blocking device comprises at least one first mobile element 41, which can be moved into at least two positions, a first position (shown in FIGS. 4 and 7) adapted to prevent a container 100 from passing between the station 2 and the oven 3, and a second position (shown in FIG. 9) adapted to allow a container 100 to pass between the station 2 and the oven 3.

In the embodiment shown, the first mobile element 41 (hereinafter also referred to as "first element 41") is preferably rotationally movable and is arranged between the station 2 and the oven 3. According to an aspect, the first mobile element 41 has an opening 410, typically in the form of a slot. The opening 410 has at least one portion 410a whose size is substantially equal to or larger than the section of a seat 21. Therefore, in the embodiment shown, when the portion 410a is placed below a seat 21 in operating position, a container 100 can disengage from the seat 21 itself and enter the duct 31 or, alternatively, climb back the duct 31 so as to enter the seat 21.

When the first element 41 is moved such that the opening 410 is not placed at a seat 21 arranged in operating position, a container 100 contained therein is supported by the solid portion 411 of the first element 41. In this case, the container 100 cannot pass through the first element 41, i.e. the communication between the station 2 and the oven 3 is prevented.

The first element 41 is preferably placed flush with (i.e. at the same height) the surface 7 of the apparatus 1, so that the containers can be alternately supported by the surface 7 or by the portion 411 of the first element 41, depending on the position of the station 2. The rotation axis of the first element 41 is therefore preferably distinct from the rotation axis of the station 2, so that when the station 2 is rotating, the path of a container 100 only partially overlaps (i.e. only a part thereof overlaps) the first element 41.

Figure 8:
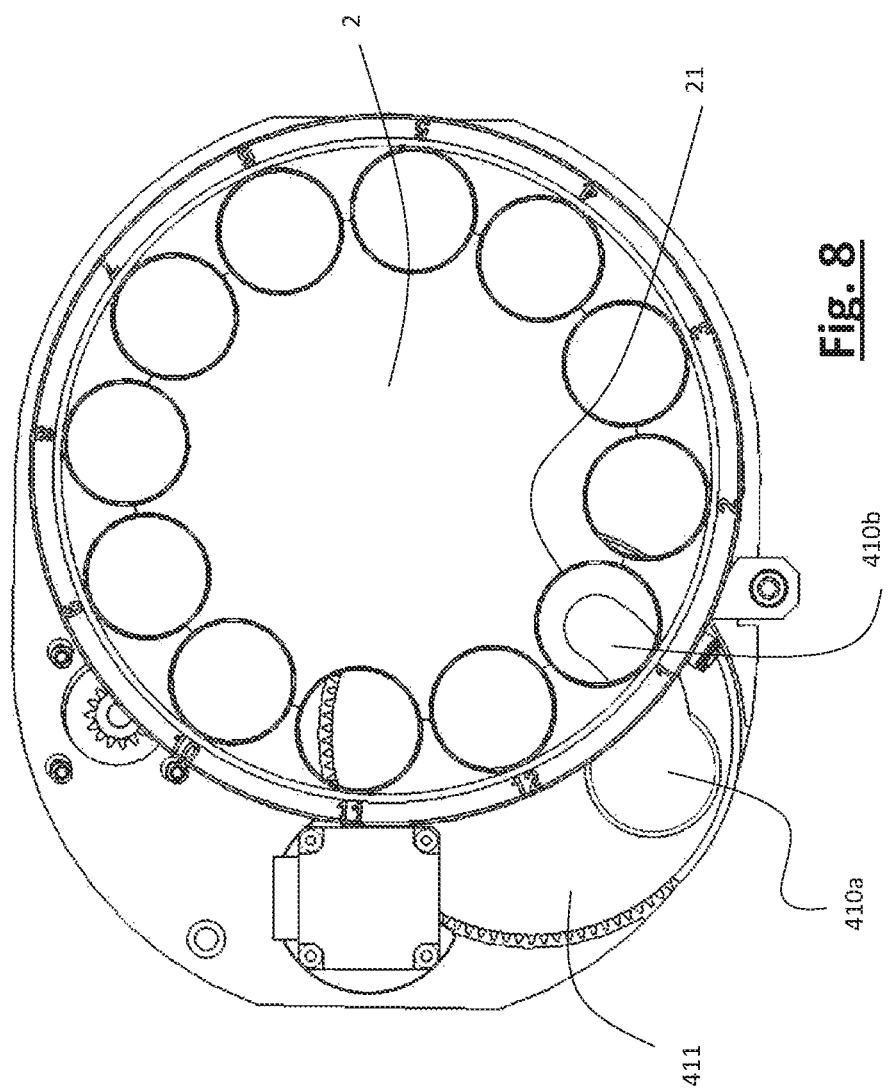

According to a possible aspect, the first element 41 is further movable into a third position (shown in FIG. 8), wherein passage of a container 100 housed in a seat 21 between the station 2 and the oven 3 is prevented, but a contact between the movement element 6 and the container 100 itself housed in the seat 21 is allowed.

Preferably, as in the embodiment shown, the opening 410 of the first element 41 has a portion 410*b* having at least one dimension smaller than the section of the seat 21, so that, when the portion 410*b* is placed at a seat 21 provided with a container 100, the latter can not pass through the first element 41.

Figure 11:
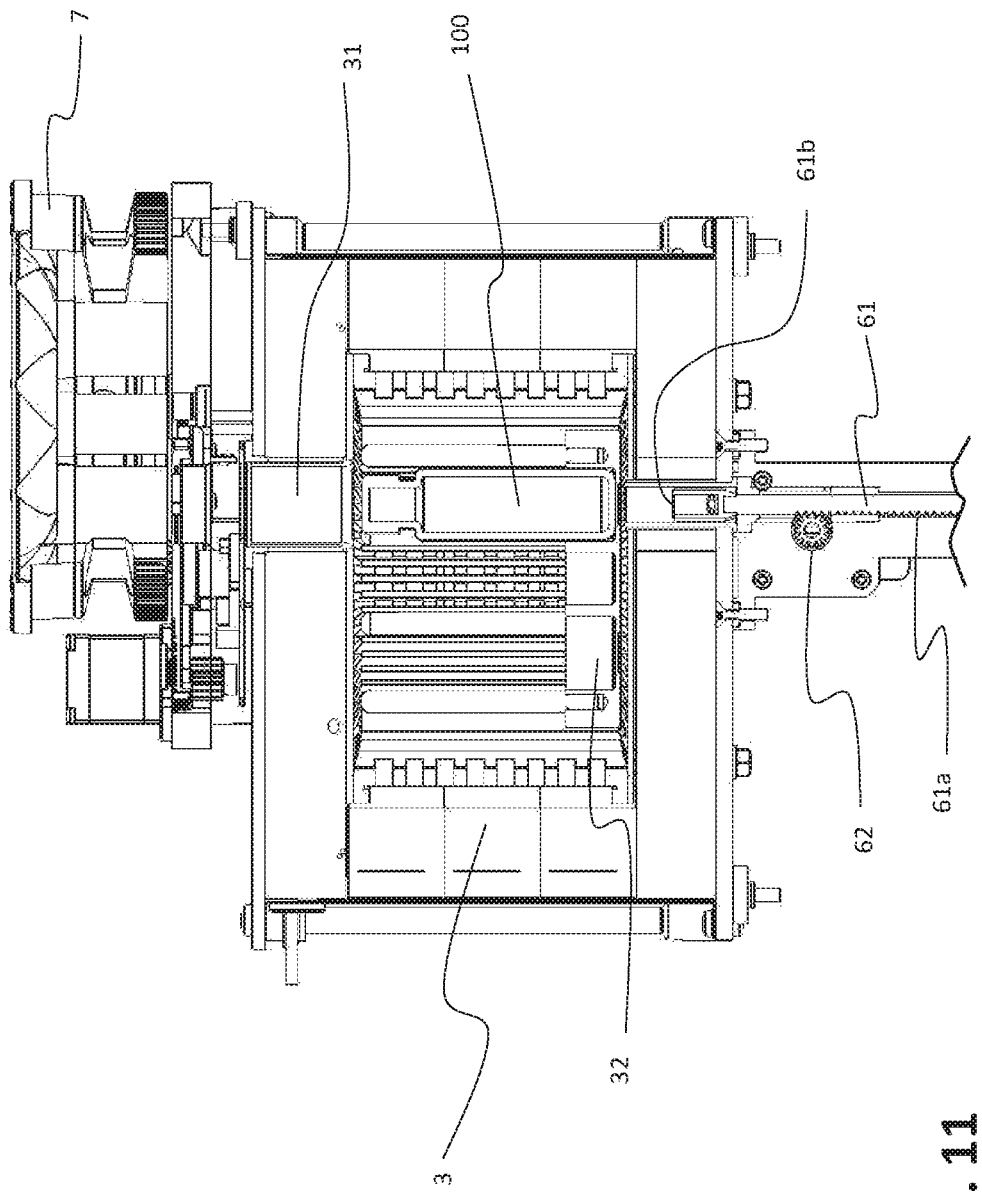
FIGS. 11 and 12 are front views of the apparatus of FIG. 1, wherein the movement device 6 is shown in different positions.
Figure 12:
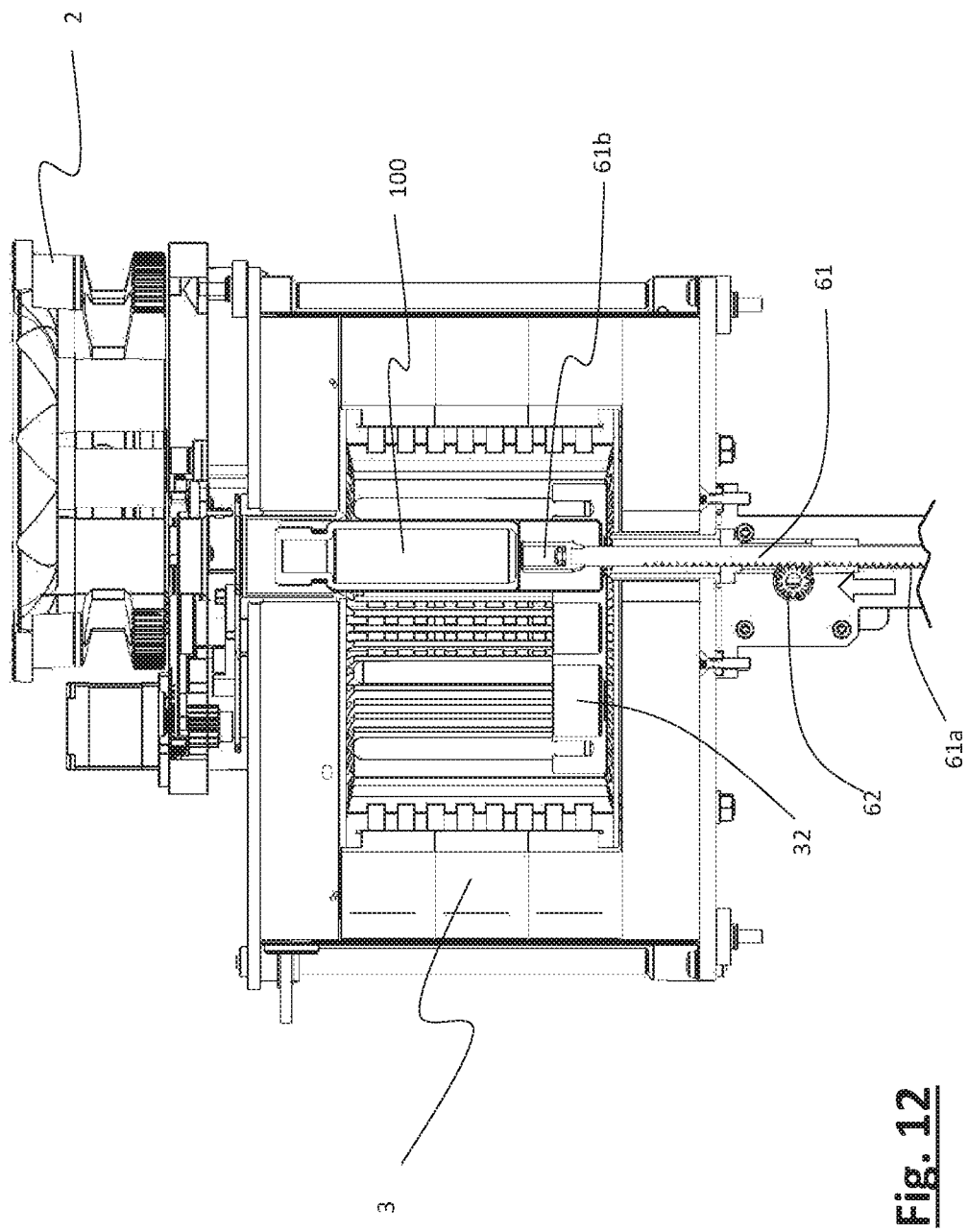

According to a possible aspect, as shown in the figures, the blocking device 4 comprises a second mobile element 42 (hereinafter also referred to as "second element 42"). The second element 42 is located downstream of the first element 41. As explained above, the definitions "upstream" and "downstream" refer to the direction of movement of a container 100 from the station 2 to the oven 3 (which, in FIGS. 1, 11 and 12 corresponds to a top-down movement).

The second element 42, too, is movable between a first position adapted to prevent the passage of a container 100 between the station 2 and the oven 3, and a second position adapted to allow the passage of a container 100 between the station 2 and the oven 3.

According to an aspect, the second element 42 is rotatable and has an opening 420 having at least one portion 420*a* whose dimensions are equal to or greater than the section of a seat 21, so as to allow a container 100 to pass through the portion 420*a*.

Referring to the embodiment shown in figures, when the second element 42 is rotated so that the opening 420 is arranged at the path of the container 100, the second element is in the second position. When, on the other hand, the solid portion 421 of the second element 42 is arranged at the path of the container 100, the latter cannot pass through the second element 42, which is therefore in the aforementioned first position, i.e. the container is prevented from passing from the oven 3 to the station 2.

Preferably, the angular extent 13 of the opening 420 of the second element 42 is equal to or greater than the angular extent a of the opening 410 of the first element 41. This way, the two elements 41 and 42 can be rotated in phase, so that the openings 410 and 420 are always aligned with each other.

According to a preferred aspect, the second element 42 is rotationally integral with the first element 41, so as to ensure that the two elements are always in phase with each other. In addition, a single motor element can be used for both the elements 41, 42.

The oven 3 can be any element able to receive and heat a container 100. Preferably, the oven 3 has a carousel 32, or in any case a movement system adapted to shake one or more containers 100.

Furthermore, the apparatus 1 further has a movement device 6 adapted to move a container 100 between a seat 21 of the station 2 and the oven 3. Various devices can be used for the purpose. In a preferred embodiment, shown in the figures, the movement device 6 comprises an elevator 61 adapted to support a container 100 from below. Thanks to this, the elevator 61 is able to lower the container 100 from the station 2 to the oven 3 and, at a later time, to lift the container 100 from the oven 3 to the station 2.

The elevator 61 can be moved in several ways known in the art. For example, in the embodiment shown in figures, the elevator 61 is equipped with a rack 61*a* operationally coupled to a pinion 62 typically moved by a respective motor.

Preferably, the elevator 61 is provided with a coupling portion 61*b* allowing the coupling with the container 100, having a section whose dimensions are smaller than the portion 410*b* of the opening 410 of the first element 41, i.e. dimensions such that the section can be contained within the portion 410*b*, so as to be able to potentially pass through the portion 410*b* of the opening 410.

Therefore, when the first element 41 of the blocking device 4 is in the third position discussed above, the container 100 is supported by the first element 41, because it cannot pass through the portion 410*b* of the opening 410, but the elevator 61 can pass through the portion 410*b* of the opening 410, so as to come into contact with the lower surface of the container 100.

The apparatus 1 further comprises a first sensor 5*a* and, preferably, a second sensor 5*b*.

The first sensor 5*a* is a sensor adapted to detect the presence of a container 100 in a seat 21, typically in the seat 21 that is in the operating position. The first sensor 5*a* is therefore preferably arranged upstream of the first element 41 of the blocking device 4 and is directed towards the position occupied by a container 100, when the latter is arranged in the seat 21.

Various sensors, such as proximity sensors, for example optical sensors, adapted to act as first sensor 5*a* are known in the art and are not discussed in detail here.

Preferred embodiments have optical reflection sensors. Possible variations can use sensors adapted to detect the presence of ferromagnetic materials (i.e. the screw cap of the container 100), such as magnetoresistive sensors.

Preferably, the apparatus 1 has a second sensor 5*b* adapted to detect the presence of a container 100 inside the oven 3. As above, different sensors, typically proximity sensors (e.g. optical) can be used as second sensor 5*b*. According to a possible aspect, the second sensor 5*b* is placed downstream of the first element 41 and, if present, it is preferably interposed between the first element and the second element of the blocking device 4.

In general, the second sensor 5*b* should be preferably placed outside the oven 3, or in any case outside the heated area of the oven 3, in order to prevent the sensor itself from being damaged. Thus, the second sensor 5*b* does not directly detect the presence of a container in the oven 3. Preferably, in fact, in order to verify if there is a container 100 in the oven 3, the movement device 6 is operated to move the container 100 from the oven 3 to a position near the second sensor 5*b*, so that the latter can verify the actual presence of the container 100 constrained to the movement device 6.

Referring to the embodiment shown, to use the sensor 5*b*, the elevator 61 lifts the container 100 so that it passes the second element 42 but not the first element 41, which is preferably arranged in the third position. As mentioned above, according to a preferred embodiment, the first and second elements 41, 42 are rotationally integral with each other, so as to ensure that the openings 410, 420 of the elements 41, 42 are aligned.

In use, one or more containers 100 are arranged in corresponding seats 21 of the station 2.

When a container 100 has to be transported from the station 2 to the oven 3, the station 2 is moved in order to arrange the container 100 in the desired position, i.e. in a position that allows the container 100 to be picked up and released from the respective seat 21 by the movement device 6. In other words, referring to the previous description, the station 2 is moved in order to arrange the seat 21 that contains the desired container 100 in the operating position.

Then, the first sensor 5*a* is operated so as to check the actual presence of the container 100 within the seat 21. For example, an optical proximity sensor can check if an element is in its proximity. If no element is detected by this sensor, the seat 21 does not contain a container 100, and the subsequent operations of the apparatus 1 are not carried out.

When the presence of the container 100 is confirmed by the first sensor 5*a*, the first mobile element 6 is moved so as to reach the container 100.

In the embodiment shown, the elevator 61 is lifted up to near the lower portion of the container 100. The second element is placed in the second position to allow the passage of the elevator 61, while the first element 41 is preferably moved to the third position, so as to support the container 100 but at the same time allow the elevator 61 to pass through the portion 410*b* of the opening 410. Then, the elevator 61 comes into contact with the bottom of the container 100.

The first element 41 is then rotated to the second position, thereby allowing the container 100 to pass through the portion 410*a* of the opening 410. The movement element 6 can now carry the container 100 from the station 2 to the oven 3. In the embodiment shown, the first element 41 is moved to the second position. The container 100 is no longer supported by the first element, but only by the elevator 61. The elevator 61 is then lowered so as to transfer the container 100 from the station 2 to the oven 3.

At this point, the oven 3 can operate to heat up and, if necessary, shake the container 100. The element 42 is preferably rotated so as to block the duct 31 thereby preventing heat losses from the oven 3 and preventing the sensors 5*a*, 5*b* from being heated.

According to a possible aspect, the signal of the first sensor 5*a* or of both the first sensor and second sensor 5*b*, if the latter is present, can be used to determine, or at least estimate, the height, and preferably (but not necessarily) also the volume, of the container 100.

In particular, the diameter of the container 100 is a datum known to the apparatus 1, since it is slightly smaller than the seat 21 or, in any case, it is communicated to the apparatus 1 by a user. The apparatus 1 also knows the speed of the movement element 6. The apparatus can thus evaluate how long one or more of its sensors is detecting the presence of the container 100, in order to assess the height thereof. Therefore, knowing the height and the diameter of the container, the apparatus 1 is able to assess the volume of the container 100.

For example, the apparatus 1 picks up a container 100 from a seat adapted to accommodate containers having a diameter of 2 cm. At first, while the container is lowering, a sensor (e.g. the second sensor 5*b*) does not detect the presence of a container 100. At a later time, the sensor detects the presence of the container 100 for the first time; subsequently, the sensor continues to detect the presence of the container until a third moment, when the sensor no longer detects the presence of the container 100. For example, if between the second and the third moments there is a difference of 3 seconds, and the elevator 61 goes down with a speed of 1 cm/second, the apparatus estimates that the height of the container 100 is 3 cm. Once the diameter and height of the container 100 are known, the apparatus has all the data required to estimate the volume of the container 100. These operations can be carried out more quickly by using the signals of several sensors, if the distance between the sensors themselves is known.

The operations to move a container 100 from the oven 3 to the station 2 are carried out in reverse order with respect to what described above. Briefly, the station 2 is arranged so that the movement device 6 can reach the seat 21 selected to house the container 100. The first sensor 5*a* is then operated to verify if this seat 21 is actually empty.

On the other hand, the second sensor is used to check the presence of the container 100 in the oven. As mentioned above, this step preferably comprises the movement of the movement device so as to arrange the container 100 near the second sensor 5*b*. Referring to the embodiment shown in the figures, the elevator 61 is lifted by such a height that the container 100, if present, does not enter the seat 21 but is anyway arranged near the second sensor 5*b*. For example, previously (i.e. during the descent of the container) the apparatus 1 estimated the height of the container, so it is able to evaluate the amount of movement required for the elevator 1.

Preferably, the first element 41 is arranged in the first or third position, so that, in case of a wrong movement of the movement device 6, the container 100 is prevented from entering the respective seat 21 before the sensors 5*a* and 5*b* have carried out the respective checks.

If the first sensor 5*a* has verified that the seat 21 is not occupied, and the second sensor 5*b* has confirmed that the container 100 is actually present in the oven 3, the operations of the apparatus 1 can continue.

In particular, the first element 41 is arranged in the second position, thereby allowing the passage of the container 100 that reaches the seat 21 thanks to the operations of the movement device 6.

Subsequently, the movement device 6 is released from the container 100, which remains in the seat 21. In particular, referring to the embodiment shown, when the container 100 passed the first element 41, the latter is moved to the third position. In this position, the movement device is still in contact with the container 100, although the latter is further supported by the first element 41 itself, i.e. by the edge of the portion 410*b* of the opening 410. The elevator 61 can then be lowered, and the first element can be arranged in the first position.

It should be noted that in a possible variation, the second and third positions of the first element 41 may coincide. In particular, the first element 41 could only be moved between a first position adapted to prevent the passage of a container between the station 2 and the oven 3, and a second position adapted to prevent the passage of a container between the station 2 and the oven 3, but adapted to allow the container 100 and the movement element 6 to contact each other. Referring to the embodiment shown, the first element 41 could therefore be movable so as to selectively arrange only the portion 410a or the portion 410b of the opening 410 below a seat 21 placed in operating position.

In a further possible variation, the blocking device could comprise a single mobile element adapted to selectively allow and prevent the passage of a container 100 between the station 2 and the oven 3 and, preferably, also to close the oven 3 during the operations thereof, in order to limit or prevent heat losses. In this embodiment, the sensor(s) is (are) preferably arranged upstream of this mobile element.

The invention claimed is:

1. An apparatus for sampling a headspace of a container, comprising:
   a mobile station provided with a plurality of housing seats to house a plurality of containers for sampling the headspace of a container;
   a heater;
   a blocking device comprising at least one first mobile element that moves between at least two positions, a first position adapted to prevent a container from the plurality of containers from passing from said mobile station to said heater, and a second position adapted to allow a container from the plurality of containers to pass from said mobile station to said heater;
   at least one first sensor placed upstream of said at least one first mobile element, to detect a presence of a container from the plurality of containers in an operating position of said housing seats upstream of said heater;
   a movement element movable between said mobile station and said heater, the movement element being configured to move a container from the plurality of containers from said mobile station to said heater, and
   a second sensor placed downstream of said at least one first mobile element and outside the heater to detect the presence of a container from the plurality of containers in said heater,
   the movement element operable to move a container from the plurality of containers from the heater to a position near the second sensor to allow the second sensor to detect the presence of the container from the heater, and
   the apparatus configured to measure a length of time the container from the plurality of containers is detected by the at least one first sensor and the second sensor as the container is moved from said mobile station to said heater, and to determine a volume and a height of the container based on the measured length of time the container from the plurality of containers is detected by the at least one first sensor and the second sensor as the container is moved from said mobile station to said heater,
   wherein the mobile station is adapted to move the plurality of housing seats and the plurality of containers in a first direction, the movement element is adapted to move the containers from said mobile station to said heater along a second direction orthogonal to a plane containing the first direction, and the blocking device is adapted to prevent movement of the container along the second direction when in the first position.

2. The apparatus for sampling a headspace of a container according to claim 1, wherein said at least one first mobile element is rotatable and an opening extending through said first mobile element is adapted to define said first and said second positions.

3. The apparatus for sampling a headspace of a container according to claim 1, wherein said at least one first mobile element is movable to a third position adapted to prevent a container from the plurality of containers from passing from said mobile station to said heater and to allow contact between a container from the plurality of containers and said movement element.

4. The apparatus for sampling a headspace of a container according to claim 1, wherein said blocking device further comprises a second mobile element disposed downstream of said at least one first mobile element, said second mobile element being movable between a first position adapted to prevent a container from the plurality of containers from passing from said mobile station to said heater, and a second position adapted to allow a container from the plurality of containers to pass from said mobile station to said heater.

5. The apparatus for sampling a headspace of a container according to claim 4, comprising said second sensor disposed downstream of said at least one first mobile element to detect the presence of a container from the plurality of containers in said heater wherein said second sensor placed downstream of said at least one first mobile element, is disposed upstream of said second mobile element.

6. A process for transferring a container from the plurality of containers from the mobile station to the heater of the apparatus according to claim 1 comprising the steps of:
   i) moving the mobile station so that a housing seat from said plurality of housing seats is arranged in a position;
   ii) operating the at least one first sensor to verify the presence of a container from the plurality of containers in the housing seat from said plurality of housing seats;
   iii) operating said movement element to reach said container from the plurality of containers;
   iv) moving said at least one first mobile element to the second position;
   v) operating said movement element so that said container from the plurality of containers is moved from said mobile station to said heater;
   wherein steps iv) and v) are carried out after the presence of the container from the plurality of containers in the housing seat from said plurality of housing seats has been confirmed in said step ii);
   wherein, in said step v), said volume and height of the container from the plurality of containers are determined, as a function of a signal of said first sensor and a signal of said second sensor that detect the presence of a container from the plurality of containers in said heater and measure a length of time the container from the plurality of containers is detected by the at least one first sensor and/or the second sensor as the container is moved from said mobile station to said heater.

7. The process for transferring the container according to claim 6 wherein, in said step iii), the at least one first mobile element is moved to a third position adapted to prevent a container from the plurality of containers from passing from said mobile station to said heater and to allow contact between a container from the plurality of containers and said movement element.

8. A process for transferring a container from the plurality of containers from the heater to the mobile station of the apparatus according to claim 1, which comprises the steps of:
   i') moving the mobile station so that a housing seat is arranged in a position;
   ii') operating the at least one first sensor to verify the absence of a container from the plurality of containers in said housing seat;
   iii') operating said second sensor to verify a presence of a container from the plurality of containers in the heater;
   iv') moving said at least one first mobile element to the second position;

v') operating said movement element so that said container from the plurality of containers is moved to said mobile station;

vi') moving said at least one first mobile element to the first position;

wherein step iv'), v') and vi') are carried out after said step ii'), the absence of a container from the plurality of containers in the housing seat has been confirmed and if in said step iii') the presence of a container from the plurality of containers in the heater has been confirmed.

9. The apparatus for sampling a headspace of a container according to claim 1, wherein the heater has a duct configured to allow a container from said plurality of containers to be displaced between the mobile station and the heater.

10. The apparatus for sampling a headspace of a container according to claim 1, wherein the movement element comprises an elevator configured to move a container from the plurality of containers from the mobile station to the heater.

11. The apparatus for sampling a headspace of a container according to claim 1, wherein the at least one first mobile element has a solid portion and an opening, the opening having a first portion whose size is substantially equal to or larger than the section of a seat of said plurality of seats.

12. The apparatus for sampling a headspace of a container according to claim 11, wherein the opening of the at least one first mobile element has a second portion having at least one dimension smaller than the section of a housing seat from said plurality of housing seats, so that, when the second portion is placed at the housing seat provided with a container from the plurality of containers, said container cannot pass through the at least one first mobile element.

13. The apparatus according to claim 1, wherein the second sensor is configured to check the presence of a container in the heater, via movement of the movement element so as to arrange the container near the second sensor.

14. The apparatus according to claim 13, wherein the movement element comprises an elevator lifted by such a height that the container does not enter the seat but is anyway arranged near the second sensor.

15. The process according to claim 6, wherein the second sensor is configured to check the presence of a container in the heater, via movement of the movement element so as to arrange the container near the second sensor, and the movement element comprises an elevator lifted by such a height that the container does not enter the seat but is anyway arranged near the second sensor.

16. The apparatus for sampling a headspace of a container according to claim 1, wherein the mobile station is adapted to rotate the housing seats along the plane and the at least one first sensor and the second sensor are adapted to detect a position of the container along said second direction.

17. The process as in claim 6, wherein the at least one first sensor and the second sensor are in fixed position along the second direction and wherein, in said step v), the volume and/or height of the container is estimated based on the length of time and a speed of the movement element.

18. The apparatus according to claim 1, wherein the apparatus is configured to determine a correct depth to which an element suitable for collecting a sample has to be inserted into a container of the plurality of containers, and to determine a correct amount of gas to be inserted into the container based on the measured volume and height of the container.

19. The process according to claim 6, further comprising the steps of vi) determining a correct depth to which an element suitable for collecting a sample has to be inserted into the container from the plurality of containers, based on the measured volume and height of the container; and vii) inserting said element into said container to said correct depth.

20. An apparatus for sampling a headspace of a container, comprising:

a mobile station provided with a plurality of housing seats to house a plurality of containers for sampling the headspace of a container;

a heater;

a blocking device comprising at least one first mobile element that moves between at least two positions, a first position adapted to prevent a container from the plurality of containers from passing from said mobile station to said heater, and a second position adapted to allow a container from the plurality of containers to pass from said mobile station to said heater;

at least one first sensor placed upstream of said at least one first mobile element, to detect a presence of a container from the plurality of containers in an operating position of said housing seats upstream of said heater;

a movement element movable between said mobile station and said heater, the movement element being configured to move a container from the plurality of containers from said mobile station to said heater, and a second sensor placed downstream of said at least one first mobile element and outside the heater to detect the presence of a container from the plurality of containers in said heater, the movement element operable to move a container from the plurality of containers from the heater to a position near the second sensor to allow the second sensor to detect the presence of the container from the heater, and the apparatus being configured to estimate measure a length of time the container from the plurality of containers is detected by the at least one first sensor and the second sensor as the container is moved from said mobile station to said heater, and to determine a volume and a height of the container based on the measured length of time the container from the plurality of containers is detected by the at least one first sensor and the second sensor as the container is moved from said mobile station to said heater, wherein the mobile station is adapted to move the plurality of housing seats and the plurality of containers in a first direction, the movement element is adapted to move the containers from said mobile station to said heater along a second direction orthogonal to a plane containing the first direction, and the blocking device is adapted to prevent movement of the container along the second direction when in the first position, wherein the at least one first sensor and the second sensor are in fixed position along the second direction and the height of the container is estimated based on speed of the movement element and an amount of time the container is detected by the sensors.

21. The apparatus according to claim 20, wherein the apparatus is configured to determine a correct depth to which an element suitable for collecting a sample has to be inserted into a container of the plurality of containers, and to determine a correct amount of gas to be inserted into the container based on the measured volume and height of the container.

* * * * *